United States Patent
Yang et al.

(10) Patent No.: US 8,150,196 B2
(45) Date of Patent: Apr. 3, 2012

(54) REDUCTION FILTER BASED ON SMART NEIGHBOR SELECTION AND WEIGHTING (NRF-SNSW)

(75) Inventors: Shengqi Yang, Chandler, AZ (US); Tiehan Lu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1113 days.

(21) Appl. No.: 11/956,845

(22) Filed: Dec. 14, 2007

(65) Prior Publication Data

US 2009/0154825 A1 Jun. 18, 2009

(51) Int. Cl.
*G06K 9/40* (2006.01)

(52) U.S. Cl. .......................... 382/261; 348/619

(58) Field of Classification Search .................. 382/260, 382/261, 275, 236; 348/241, 607, 608, 618, 348/619, 620, 610, 701
See application file for complete search history.

(56) References Cited

U.S. PATENT DOCUMENTS

| | | | |
|---|---|---|---|
| 5,671,264 A | 9/1997 | Florent et al. | |
| 6,024,705 A | 2/2000 | Schlager et al. | |
| 6,037,986 A * | 3/2000 | Zhang et al. | 375/240.12 |
| 7,092,016 B2 | 8/2006 | Morton et al. | |
| 2003/0103568 A1* | 6/2003 | Lee et al. | 375/240.16 |
| 2006/0139486 A1* | 6/2006 | Caviedes | 348/452 |
| 2006/0176313 A1 | 8/2006 | Xu et al. | |
| 2008/0253456 A1* | 10/2008 | Yin et al. | 375/240.16 |

OTHER PUBLICATIONS

Neiger, Gilbert et al. U.S. Appl. No. 11/694,344, filed Mar. 30, 2007 entitiled, "Detecting Spin Loops in a Virtual Machine Environment".
Teramoto, Atsushi et al., "Improvement of Image Quality in MR Image Using Adaptive K-nearest Neighbour Averaging Filter", International Conference on Information, Communicatons and Signal Processing ICICS '97, (Sep. 2007), pp. 190-194.
Atsushi Teramoto, et al., "Improvement of image quality in MR image using adaptive K-nearest neighbor averaging filter," Sep. 1997, Proceedings of 1997 International Conference on Information, Communications and Signal Processing, pp. 190-194.

(Continued)

*Primary Examiner* — Jon Chang
(74) *Attorney, Agent, or Firm* — Grossman, Tucker, Perreault & Pfleger, PLLC

(57) ABSTRACT

The present disclosure describes a method and apparatus for filtering noise in a video image, comprising receiving a first video image, a second video image and motion information wherein the first image may be an image to be filtered and the second image may be a filtered image wherein the second image may be temporally related to said first image. The method may further include, for at least one pixel in the first video image, selecting at least one neighbor of the pixel from the first video image and selecting at least one neighbor of the pixel from said second video image, wherein selection of the neighbors from the first video image and the second video image may be based on said motion information; selecting a subset of the neighbors wherein the subset may be less than or equal to a sum of neighbors from the first video image and the second video image; determining a weighted average of the subset of said neighbors and the pixel; and outputting the weighted average as a filtered pixel of the first video image. Of course, many alternatives, variations and modifications are possible without departing from this embodiment.

14 Claims, 3 Drawing Sheets

OTHER PUBLICATIONS

Eric J. Balster, et al., "Combined spatial and temporal domain wavelet shrinkage algorithm for video denoising," Feb. 2006, IEEE Transactions on Circuits and Systems for Video Technology, vol. 16, No. 2, pp. 220-230.

"K-nearest neighbor algorithm," Apr. 2007, available at http://en.wikipedia.org/wiki/Nearest_neighbor_(pattern_recognition).

Markus Friebe, et al., "Low complexity two classes gauss weighting filter for noise reduction in mobile received analog tv signals," available at http://www.eurasip.org/Proceedings/Eusipco/Eusipco2005/defevent/papers/cr1292.pdf, 2005.

"Video Compression Motion Estimation," Lecture Notes 9—Motion Estimation, Oct. 28, 1999, available at http://www.apl.jhu.edu/Notes/Geckle/525759/lecture9.pdf.

Dietrich Wettschereck, et al., "Locally adaptive nearest neighbor algorithms," Advances in Neural Information Processing Systems 6, 1994.

Jigang Wang, et al., "Improving nearest neighbor rule with a simple adaptive distance measure," Pattern Recognition Letters 28, 2007, pp. 207-213.

Ricardo Gutierrez-Osuna, "Lecture 8: The K Nearest Neighbor Rule (k-NNR)," Introduction to Pattern Recognition, 2002.

Douglas A. Kerr, P.E., "Chromaticity and Chrominance in Color Definition," Aug. 2003, Issue 3, available at http://doug.kerr.home.att.net/pumpkin/Chromaticity_Chrominance_DAK.pdf.

Marsh, "Temporal Rate Conversion," Dec. 2001, available at http://www.microsoft.com/whdc/archive/TempRate1.mspx?pf=true, 2001.

Mohammad Kolahdouzan, et al., "Voronoi-Based K Nearest Neighbor Search for Spatial Network Databases," available at http://www.vldb.org/conf/2004/RS21P6.PDF, 2004, pp. 840-851.

Yifan Li, et al., "Continuous K-Nearest Neighbor Search for Moving Objects," available at http://www-faculty.cs.uiuc.edu/~hanj/pdf/ssdbm04_moving.pdf, Jun. 2004, pp. 124-126.

Francisco Gallegos-Funes, et al., "ABST M-Type K-Nearest Neighbor (ABSTM-KNN) for Image Denoising," The Institute of Electronics, Information and Communication Engineers, 2005, pp. 798-799, Abstract Only.

Bram Van Ginneken, et al., "Image Denoising with k-nearest Neighbor and Support Vector Regression," Pattern Recognition, 2006. ICPR 2006. 18th International Conference on vol. 3, pp. 603-606, Abstract Only.

Vladimir Zlokolica, et al., "Motion- and detail-adaptive denoising of video," Image Processing: Algorithms and Systems III, 2004, pp. 403-412, vol. No. 5298, Abstract Only.

* cited by examiner

Next Image
(Spatial Domain)
Previous Image
(Temporal Domain)
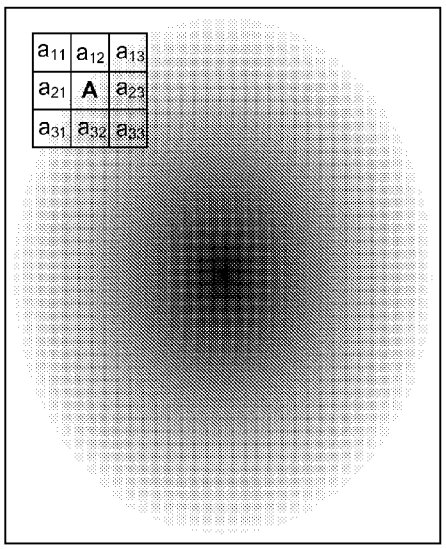
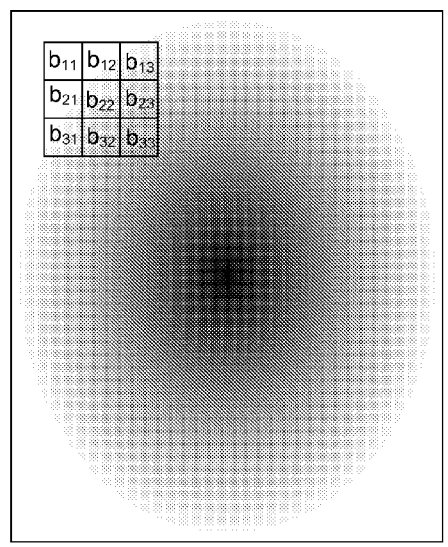
FIG. 2A
FIG. 2B

REDUCTION FILTER BASED ON SMART NEIGHBOR SELECTION AND WEIGHTING (NRF-SNSW)

FIELD

The present disclosure describes a system for implementing a noise reduction filter based on smart neighbor selection and weighting that may be used for video image processing.

BACKGROUND

Video images such as those used in television and/or streaming video may be degraded by noise. The noise may be introduced by the transmission medium and/or the electrical circuitry associated with the generation, transmission and reception of the video images. It may be desirable to filter such images prior to display to reduce this noise and thereby improve the quality of the displayed images.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIGS. 2A and 2B depict an exemplary next image and an exemplary previous image, respectively, each with an illustrative neighborhood defined.

Although the following Detailed Description will proceed with reference being made to illustrative embodiments, many alternatives, modifications, and variations thereof will be apparent to those skilled in the art.

DETAILED DESCRIPTION

Generally, this disclosure describes a system for filtering noise based on smart neighbor selection and weighting. The system may be used for image processing. For example, the system may be to filter noise in video (including streaming video) and/or television images. The system may receive as inputs: a previous image, a next image and motion information. The previous image may correspond to the image prior (in time) to the next image. The previous image may be filtered prior to being input to the system. The next image may include noise that is to be reduced, i.e., filtered. The motion information may be provided by a motion estimation module.

An image may include a field or a frame. A sequence of images may be combined and may provide the appearance of movement to a human eye. In an embodiment, the sequence of images may include interlaced fields. In another embodiment, the sequence of images may include progressive frames. For example, high definition digital television (HDTV) images may include interlaced fields and/or progressive frames.

Each image may include an array of picture elements, i.e., pixels. Each pixel may be defined by a plurality of associated image components. For example, each pixel may be represented by image components Y, U and V. Y may represent luminance or brightness. U and V may represent chrominance or color. Y, U and V values may be converted into RGB (red-green-blue) color space values. For example, an image may be detected and/or recorded in the RGB color format, may be converted to the YUV format for transmission and may be converted back to the RGB color format for display.

The noise reduction filter with smart neighbor selection and weighting may be applied to each image component (e.g., Y, U, and V) of each pixel in a next image. For each image component associated with each pixel in the next image, the system may use the motion information to define a neighborhood for that image component for that pixel. For example, the next image may be considered a spatial domain for the neighborhood selection. The previous image may be considered a temporal domain for the neighborhood selection. The system may then select all or less than all of the pixels in a neighborhood for use in the noise reduction filter. This may be repeated for each component of each pixel and for each pixel of the next image until the entire image has been filtered. In an embodiment, pixels may be processed sequentially, one pixel at a time. In another embodiment, the pixels may be processed in parallel. Whether pixels are processed sequentially or in parallel may depend on the hardware configuration.

Figure 1:
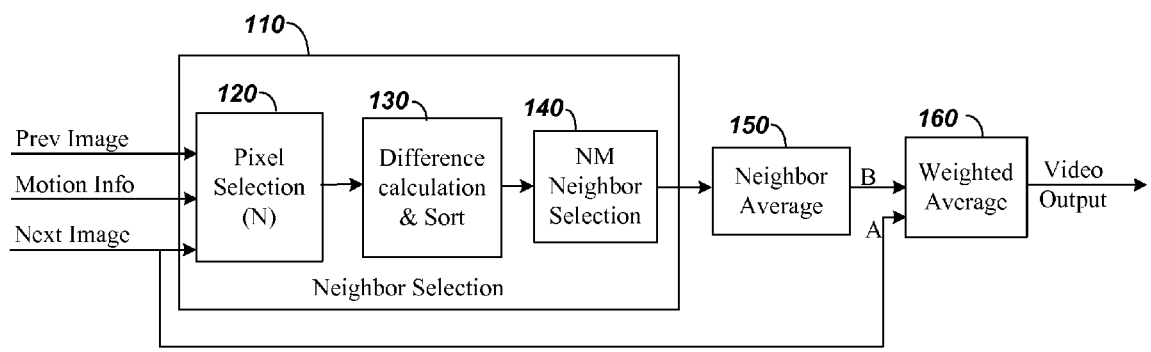
FIG. 1 illustrates an exemplary functional block diagram, consistent with the present disclosure.

Attention is directed to FIG. 1 which depicts an illustrative functional block diagram 100 of one embodiment of a noise reduction filter based on smart neighbor selection and weighting (NRF-SNSW). As discussed above, the system 100 may receive as inputs, a previous image (e.g., Prev Image), a next image (e.g., Next Image) and motion information (e.g., Motion Info). Prev Image may be a prior (in time) image relative to Next Image and Next Image may be the image that is to be filtered. Prev Image may have passed through a noise reduction filter (such as system 100) before being input to system 100.

Motion Info may be provided by a motion estimation module. Motion estimation may be accomplished by matching features and/or regions between successive images. For example, a feature may include an edge and a region may include a block of one or more pixels. Through comparison of features and/or regions between successive images, motion may be detected and possibly quantified. Motion estimation may also use gradients. These gradients may include temporal changes and/or spatial changes in image intensity and/or the manner in which the image is moving. The system 100 may be independent of the manner in which Motion Info is determined.

Neighbor Selection 110 may provide a m-nearest neighbor selection. The neighbor selection may depend on whether Next Image is moving relative to Prev Image. Next Image may provide a spatial domain for a nearest neighbor selection and Prev Image may provide a temporal domain for a nearest neighbor selection. FIGS. 2A and 2B in combination with FIG. 1 may illustrate neighbor selection. FIG. 2A depicts an example of a next image including an illustrative pixel of interest, pixel A, and an array of pixels, $a_{11}$-$a_{33}$, around pixel A. FIG. 2B depicts an example of a previous image including an array of pixels, $b_{11}$-$b_{33}$, around and including a pixel location corresponding to pixel A of FIG. 2A. For illustrative purposes, the physical dimensions of A, $a_{11}$-$a_{33}$, and $b_{11}$-$b_{33}$ are shown much larger than actual size.

Neighbor Selection 110 (via Pixel Selection (N) 120) may receive Prev Image, Motion Info and Next Image. Pixel Selection (N) 120 may then select the domain or domains (temporal and/or static) based on Motion Info.

When pixel A of the next image is not moving relative to the previous image, it may be assumed that pixels in a small window around pixel A are also not moving. For example, as shown in FIGS. 2A and 2B, a 3 by 3 array of pixels may correspond to a relatively small window. Accordingly, neighbors for pixel A may include eight pixels from Next Image ($a_{11}$-$a_{33}$) and nine pixels from Prev Image ($b_{11}$-$b_{33}$) yielding seventeen pixels. The image component values may be stored in an array (e.g., NeighborArray). NeighborArray may be an array of size N where N is seventeen. Accordingly, the neighbor array for a static (i.e., non-moving) pixel may contain pixels from both the next image and the previous image.

When pixel A of the next image is moving relative to the previous image, it may be assumed that pixels in a small window around pixel A are also moving. Accordingly, pixels in Prev Image may not be neighbors of pixel A and only pixels in Next Image that are in the small window around pixel A may be neighbors of pixel A. For example, as shown in FIG. 2A, a 3 by 3 array of pixels may correspond to a relatively small window. Accordingly, neighbors for pixel A may include eight pixels from Next Image ($a_{11}$-$a_{33}$) yielding a NeighborArray of size N where N is eight.

The number of pixels considered neighbors may be related to hardware complexity and processing speed. The number of pixels considered neighbors may also be related to the magnitude of potential noise reduction. Increasing the number of neighbors may increase the hardware complexity and reduce the processing speed. Increasing the number of neighbors may increase the magnitude of the potential noise reduction.

The number of neighbors and the distribution shown above (3×3 arrays) are an illustrative example. The distribution of neighbors in the temporal domain may or may not be the same as the distribution of neighbors in the spatial domain. For example, the temporal domain may include one pixel, e.g., pixel $b_{22}$ of FIG. 2B, and the spatial domain may include two pixels, e.g., pixels $a_{21}$ and $a_{23}$ of FIG. 2A. If Motion Info indicated pixel A was moving then N may include two pixels, e.g., pixels $a_{21}$ and $a_{23}$ of FIG. 2A, and if Motion Info indicated pixel A was static then N may include three pixels, e.g., pixels $a_{21}$ and $a_{23}$ of FIG. 2A and pixel $b_{22}$ of FIG. 2B. This disclosure is in no way limited to a number of neighbors nor to a distribution. The number of neighbors and the distribution may be chosen according to the particular application.

Basing neighbor selection on a motion condition may be advantageous. Such motion-based neighbor selection may be considered motion adaptive. For example, in the static case the neighbors may be selected from both the next image and the previous image. For a given window size, more pixels (neighbors) may be used in calculating a noise reduction filter. Noise reduction may be thereby enhanced. On the other hand, in the moving case, the neighbors may be selected only from the next image. Corresponding pixels from the previous image may not be included. Accordingly, including static pixels as neighbors may be avoided.

Turning again to FIG. 1, after the neighbors have been selected for an image component (e.g., Y) for a pixel (e.g., pixel A), further processing may occur. The processing may be similar for both the static and moving cases. After the N neighboring pixels have been selected and stored in NeighborArray in Pixel Selection 120, absolute differences may be determined between the value of the image component of pixel A and the values of the image component for each of the N neighboring pixels in Difference Calculation & Sort 130. The N absolute differences may then be sorted in Difference Calculation & Sort 130. As a result of the sorting, NeighborArray may then contain N neighboring pixel image component values ordered according to the absolute differences between each neighboring pixel and pixel A. This order may be minimum absolute difference to maximum absolute difference.

NM of the N neighboring pixel image component values may then be selected in NM Neighbor Selection 140. NM may be less than or equal to N. The number of values selected may depend on a tradeoff between hardware complexity and the magnitude of noise reduction. A larger NM may provide greater noise reduction at a cost of greater hardware complexity while a smaller NM may reduce hardware complexity at a cost of lesser noise reduction. For example, NM may be chosen according to the number of line busses available.

In an embodiment, NM neighbors may then be input to Neighbor Average 150. Neighbor Average 150 may determine a simple average, B, of NM neighbors and may output this average. Weighted Average 160 may receive the average, B, of NM neighbors, and the value of the image component for pixel A. In other embodiments, the average of NM neighbors may not be determined. In these embodiments, NM neighbors may be provided to Weighted Average 160. In one embodiment, an equal weight may be assigned to all NM neighbors and the value of the image component for pixel A. In another embodiment, individual weights may be assigned to each neighbor and the value of the image component for pixel A according to the difference between the neighboring pixels and the value of the image component for pixel A. Weighted Average 160 may then determine a weighted average of the NM neighbors and the value of the image component for pixel A.

Weighted Average 160 may then provide this weighted average as output as Video Output. This weighted average may then correspond to a filtered pixel A. Each image component of each pixel of an image to be filtered (next image) may be processed accordingly.

In an embodiment, the weighted average may be determined according to the following pseuodcode.

```
Define two integer 16-entry LUTs a_value[16] and d_value[16]
For each entry of the LUTs
{
    Generate a temp_value as a function of entry index
    a_value[i] = 64−temp_value;
    d_value[i] = 64+temp_value;
}
End For
LUT_index = Last four digits of (abs(NextY −
PrevY)>>TWShift(denoising strength));
Weight_Next = d_value[LUT_index];
Weight_Prev = a_value[LUT_index];
dstY = (Weight_Next * NextY + Weight_Prev * PrevY)>>7;
```

Referring to the pseudocode, it may be appreciated that weights used in the weighted average may be determined and stored in one or more lookup tables (LUTs). These weights may be determined once initially and may then be available for subsequent processing of pixel image component data. Accordingly, in an embodiment, two 16-entry integer LUTs, a_value[i] and d_value[i] may be defined. In an embodiment, Temp_value may be determined as a function of a LUT index, i, as: (i*i)>>2. The a_value LUT may correspond to weights used for next image (e.g., pixel A). The d_value LUT may correspond to weights used for the neighbor average (e.g., B). It may be appreciated that these weights, when summed may equal 128. The complementary nature of the weights may facilitate calculating the filtered output on a general purpose processor.

For each image component for each pixel of a next image, a LUT_index may be determined. In the pseudocode, NextY may correspond to the value of the pixel to be filtered and PrevY may correspond to the average of the NM neighbors. In an embodiment, the four least significant bits (LSBs) of the absolute difference between NextY and PrevY may be determined. This value may then be right shifted by denoising strength.

In an embodiment, denoising strength may be a user-definable parameter. In an embodiment, denoising strength may be in the range of zero to four. A smaller denoising strength may correspond to relatively low noise images and a larger denoising strength may correspond to a relatively noisy images. Denoising strength may adjust the relative weight used in calculating the weighted average.

The LUT_index may then be used to select weights from the LUTs. Relatively smaller values of LUT_index may correspond to the case where the image component of next image may be nearly equivalent to the neighbor average. Relatively larger values of LUT_index may correspond to the case where the image component of next image may differ from the neighbor average. As the difference between image component of the next image and the neighbor average increases, the contribution of the image component of the next image may be more heavily weighted relative to the contribution of the neighbor average in calculating the weighted average. Denoising strength may adjust this relative weighting by reducing the weight of the image component of next image and increasing the weight of the neighbor average in a relatively noisy environment.

The weighted average of the image component of next image and the neighbor average may then be determined. The result may be the filtered image component of next image. The process may then be repeated for each image component of each pixel. As noted above, the filtered image components may be determined sequentially or in parallel.

Figure 3:
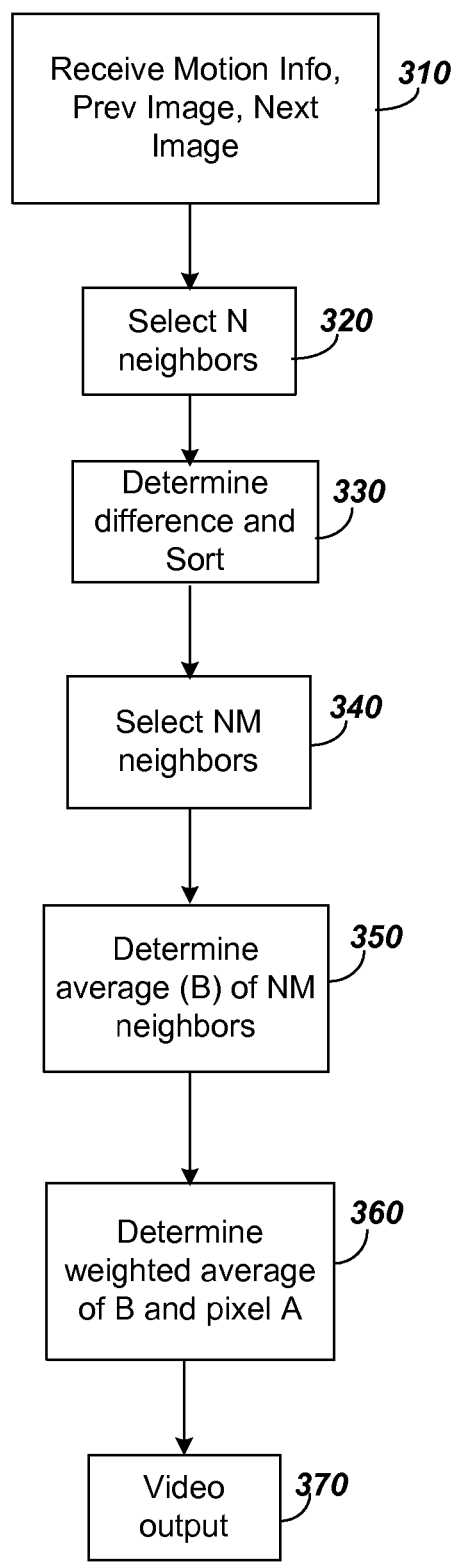
FIG. 3 depicts an exemplary flowchart consistent with the present disclosure.

FIG. 3 depicts a flowchart 300 according to one exemplary embodiment of a noise reduction filtering based on smart neighbor selection and weighting consistent with the present disclosure. Operations may include receiving, by a general purpose processor, a previous image, a next image and motion information 310. Operations may also include determining, at least in part and in response to the motion information, the N neighbors of an image component of a pixel (A) in next image 320.

Operations may also include determining absolute differences between N neighbors and a pixel being processed 330. Operations may also include sorting the absolute differences in order of smallest to largest 330. Operations may also include selecting, by the general purpose processor, NM neighbors for further processing 340. NM may be less than or equal to N and may depend on the hardware configuration.

Operations may also include determining an average (B) of NM neighbors 350. Operations may also include determining a weighted average of B and the pixel A 360. Operations for determining the weighted average may include determining an index for a lookup table or tables. The lookup table index may depend on a difference between the average B and the pixel A. The lookup table index may further depend on a denoising parameter that may be adjusted according to the amount of noise present. Operations may further include providing the weighted average of B and pixel A as video output 370. The video output may correspond to a noise-filtered pixel A.

Embodiments of the methods described herein may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method of filtering noise in a video image, comprising:
receiving a first video image, a second video image and motion information wherein said first image is an image to be filtered and said second image is a filtered image wherein said second image is temporally related to said first image;
for at least one pixel in said first video image:
selecting at least one neighbor of said pixel from said first video image and selecting at least one neighbor of said pixel from said second video image, wherein selection of said neighbors from said first video image and said second video image is based on said motion information;
selecting a subset of said neighbors wherein said subset is less than or equal to a sum of neighbors from said first video image and said second video image;
determining a plurality of weights for a weighted average and storing said weights in a lookup table;
determining a weighted average of said subset of said neighbors and said pixel;
outputting said weighted average as a filtered pixel of said first video image.

2. The method of claim 1, further comprising determining an average of said subset of said neighbors.

3. The method of claim 1, further comprising determining an index for said lookup table based on a difference between said pixel and said neighbors.

4. The method of claim 3, further comprising adjusting said index according to a denoising strength.

5. The method of claim 1, wherein said subset of said neighbors comprises one neighbor from said second image and two neighbors from said first image.

6. A video processor for reducing noise in a video image comprising:
electronic circuitry configured to receive a first image, a second image and motion information wherein said first image is an image to be filtered and said second image is a filtered image wherein said second image is temporally related to said first image; and for at least one pixel in said first video image:

configured to select at least one neighbor of said pixel from said first video image and configured to select at least one neighbor of said pixel from said second video image, wherein selection of said neighbors from said first video image and said second video image is based on said motion information;

configured to select a subset of said neighbors wherein said subset is less than or equal to a sum of neighbors from said first video image and said second video image;

configured to determine a plurality of weights for a weighted average and storing said weights in a lookup table;

configured to determine a weighted average of said subset of said neighbors and said pixel;

configured to output said weighted average as a filtered pixel of said first video image.

7. The video processor of claim 6, further comprising electronic circuitry configured to determine an average of said subset of said neighbors.

8. The video processor of claim 6, further comprising electronic circuitry configured to determine an index for said lookup table based on a difference between said pixel and said neighbors.

9. The video processor of claim 8, further comprising electronic circuitry configured to adjust said index according to a denoising strength.

10. The video processor of claim 6, wherein said subset of said neighbors comprises one neighbor from said second image and two neighbors from said first image.

11. An article, comprising:

a storage medium having stored thereon instructions that when executed by a processor results in the following:

receiving a first video image, a second video image and motion information wherein said first image is an image to be filtered and said second image is a filtered image wherein said second image is temporally related to said first image;

for at least one pixel in said first video image:

selecting at least one neighbor of said pixel from said first video image and selecting at least one neighbor of said pixel from said second video image, wherein selection of said neighbors from said first video image and said second video image is based on said motion information;

selecting a subset of said neighbors wherein said subset is less than or equal to a sum of neighbors from said first video image and said second video image;

determining a plurality of weights for a weighted average and storing said weights in a lookup table;

determining a weighted average of said subset of said neighbors and said pixel; and outputting said weighted average as a filtered pixel of said first video image.

12. The article of claim 11, wherein said instructions that when executed by said processor result in the following additional operations:

determining an average of said subset of said neighbors.

13. The article of claim 11, wherein said instructions that when executed by said processor result in the following additional operations:

determining an index for said lookup table based on a difference between said pixel and said neighbors.

14. The article of claim 13, wherein said instructions that when executed by said processor result in the following additional operations:

adjusting said index according to a denoising strength.

* * * * *

UNITED STATES PATENT AND TRADEMARK OFFICE
CERTIFICATE OF CORRECTION

| | | |
|---|---|---|
| PATENT NO. | : 8,150,196 B2 | Page 1 of 1 |
| APPLICATION NO. | : 11/956845 | |
| DATED | : April 3, 2012 | |
| INVENTOR(S) | : Shengqi Yang and Tiehan Lu | |

It is certified that error appears in the above-identified patent and that said Letters Patent is hereby corrected as shown below:

On the title page item (54) and col. 1, line 1, add the word "NOISE" at the beginning of the title. It should read "NOISE REDUCTION FILTER…"

On the title page item (56), line 2, under Other Publications delete "entitiled," and insert --entitled,--, therefor.

On the title page item (56), line 5, under Other Publications delete "Communicatons" and insert --Communications--, therefor.

Signed and Sealed this
Twenty-eighth Day of August, 2012

David J. Kappos
*Director of the United States Patent and Trademark Office*